United States Patent
Al-Roubaiey et al.

(10) Patent No.: US 10,484,286 B2
(45) Date of Patent: Nov. 19, 2019

(54) ADAPTIVE RELIABILITY PROTOCOL

(71) Applicant: KING FAHD UNIVERSITY OF PETROLEUM AND MINERALS, Dhahran (SA)

(72) Inventors: Anas Abdulwahid Al-Roubaiey, Alkhobar (SA); Tarek R Sheltami, Dhahran (SA); Ashraf S. Hasan Mahmoud, Dhahran (SA)

(73) Assignee: King Fadh University of Petroleum and Minerals, Dhahran (SA)

( * ) Notice: Subject to any disclaimer, the term of this patent is extended or adjusted under 35 U.S.C. 154(b) by 270 days.

(21) Appl. No.: 15/012,891

(22) Filed: Feb. 2, 2016

(65) Prior Publication Data

US 2017/0222936 A1   Aug. 3, 2017

(51) Int. Cl.
*H04L 12/851* (2013.01)
*H04L 12/26* (2006.01)

(52) U.S. Cl.
CPC .......... *H04L 47/24* (2013.01); *H04L 43/0864* (2013.01)

(58) Field of Classification Search
CPC ........ H04L 45/50; H04L 47/125; H04L 47/82
USPC ........................................................ 370/229
See application file for complete search history.

(56) References Cited

U.S. PATENT DOCUMENTS

| | | | |
|---|---|---|---|
| 8,472,348 B2 | 6/2013 | Hui et al. | |
| 2007/0254593 A1* | 11/2007 | Jollota | A61B 5/14532 455/67.11 |
| 2010/0118876 A1* | 5/2010 | Meyer | H04L 1/1851 370/394 |
| 2010/0290338 A1* | 11/2010 | Park | H04L 1/0076 370/217 |
| 2013/0067063 A1* | 3/2013 | Vasseur | H04L 45/026 709/224 |
| 2016/0234172 A1* | 8/2016 | Agarwal | H04L 63/0428 |

FOREIGN PATENT DOCUMENTS

| | | |
|---|---|---|
| EP | 1 755 284 A1 | 2/2007 |
| IN | 2013/00476 | 4/2013 |

OTHER PUBLICATIONS

Y. Lyer, S. Gandham and S. Venkatesan, "STCP: a generic transport layer protocol for wireless sensor networks," in the 14th IEEE International Conference on Computer Communications and Networks, San Diego, Calif., 2005 (Year: 2005).*

M.Souil, et al., "Efficient QoS Provisioning at the MAC Layer in Heterogeneous Wireless Sensor Networks" Computer Communications, Jan. 21, 2014,pp. 1-17

* cited by examiner

*Primary Examiner* — Huy D Vu
*Assistant Examiner* — Nizam U Ahmed
(74) *Attorney, Agent, or Firm* — Oblon, McClelland, Maier & Neustadt, L.L.P.

(57) ABSTRACT

A device, method, and non-transitory computer readable medium that determine a reliability level for a communication network. A packet delivery ratio (PDR) is determined for a round period of the communication network operating at an adaptive reliability level based on a packet serial number (PSN). The communication network is controlled in a best effort mode, a reliable mode, or a switching mode based on the PDR.

16 Claims, 9 Drawing Sheets

ADAPTIVE RELIABILITY PROTOCOL

BACKGROUND

Technical Field

The present disclosure is directed to an adaptive reliability protocol for wireless sensor networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many of the proposed reliability quality of service (QoS) protocols for sensor networks are transport solutions as described by Y. Lyer, S. Gandham and S. Venkatesan, "STCP: a generic transport layer protocol for wireless sensor networks," in the 14*th IEEE International Conference on Computer Communications and Networks*, San Diego, Calif., 2005, Y. Zhou and M. Lyu, "PORT: a price-oriented reliable transport protocol for wireless sensor network," in the 16*th IEEE International Symposium on Software Reliability Engineering (ISSRE)*, Chicago, Ill., 2005, S. Park, R. Vedantham, R. Sivakumar and I. Akyildiz, "A scalable approach for reliable downstream data delivery in wireless sensor networks," in the *ACM MobiHoc '04*, Roppongi, Japan, 2004, and V. Gungor and O. Akan, "DST: Delay sensitive transport in wireless sensor networks," in the *Seventh IEEE International Symposium on Computer Networks (ISCN)*, 2006, the entire contents of which are incorporated herein by reference. Transport layer solutions are typically coupled with the sensor platforms, which are integrated with existing routing/transport protocols.

Message Queuing Telemetry Transport for sensors networks (MQTTS-S) is described in A. S. Stanford-Clark and H. L. Truong, "MQTT for sensor networks (MQTT-S) protocol specification," 2008, and U. Hunkeler, H. L. Truong and A. Stanford-Clark, "MQTT-S—A publish/subscribe protocol for Wireless Sensor Networks," in 3*rd International Conference on Communication Systems Software and Middleware and Workshops (COMSWARE 2008)*, 2008, the entire contents of which are incorporated herein by reference. MQTT-S is an IBM publisher/subscriber (pub/sub) protocol invented by Stanford-Clark and Hunkeler in 1999. MQTT-S is a simple and lightweight messaging protocol designed for constrained devices with low bandwidth and for high-latency or unreliable networks. Consequently, due to the lightweight properties, an extended version of the MQTT protocol was proposed, which was suitable for wireless sensor networks. The extended version of the MQTT protocol simplified the integration of the wireless sensor networks (WSNs) with the enterprise networks by extending the enterprise pub/sub middleware protocols into the WSN infrastructure. In the architecture, the complexity of the sensor devices was reduced, and the pub/sub service included built-in brokers that used the original MQTT protocol. The sensor devices used the collection tree protocol (CTP), as described by O. Gnawali, R. Fonseca, K. Jamieson, D. Moss and P. Levis, "Collection tree protocol," in *Proceedings of the 7th ACM Conference on Embedded Networked Sensor Systems,* 2009, the entire contents of which are incorporated herein by reference, as the underlying protocol which allows any device to send data to the closest gateway. MQTT is also described in A. Stanford-Clark and U. Hunkeler, "MQ Telemetry Transport (MQTT)," 1999. [Online]. Available: http://mqtt.org. [Accessed 23 11 2014], the entire contents of which are incorporated herein by reference.

At the application layer, three levels of reliability are provided by MQTT-S, which include: (1) best effort, where the publisher sends just once whether successfully received or not; (2) retransmit until the message is acknowledged, which may incur redundancy; and (3) assure no redundancy. Although QoS is provided, the MQTT-S reliability protocol does not adapt to network conditions since levels (2) and (3) function with fixed timeout at the publisher side. Further, the QoS control is implemented at the publisher side, which in most cases is the side with the battery-powered sensors, so network lifetime is reduced due to power consumption constraints.

Constrained Application Protocol (CoAP) was developed based on the fundamental Representational State Transfer (REST) architecture of the web as described by Z. Shelby, B. Frank and D. Sturek, "Constrained Application Protocol (CoAP)," IETF—The Internet Engineering Task Force, 2012, the entire contents of which are incorporated herein by reference. CoAP was developed for constrained devices and networks, such as WSNs, to ease integration with internet applications while still meeting specifications of constrained applications, such as Machine-to-Machine and home and building automation. CoAP includes two interaction models: the client/server model and the pub/sub model.

CoAP realizes a reliable QoS through two types of messages: (1) a confirmable message where the publisher sends the message and waits for acknowledgement from the subscriber, and (2) a non-confirmable message where the publisher does not wait for acknowledgement, e.g., best effort. As with the MQTT-S model, the confirmable message also includes a fixed retransmission timeout. Likewise, CoAP does not take into consideration the network conditions to adapt the reliability protocol. In addition, the packet loss recovery control is also built at the publisher side, which can have a significant effect on network lifetime due to the limited battery life.

The adaptive retransmission timeout (RTO) protocol as described in E. Davis, A. Calveras and L. Demirkol, "Improving Packet Delivery Performance of Publish/Subscribe Protocols in Wireless Sensor Networks," *Sensors*, vol. 13, no. 1, pp. 648-680, 2013, the entire contents of which are incorporated herein by reference, aims at improving the static reliable QoS proposed in the MQTT-S and CoAP. Likewise, the adaptive RTO is an application-based solution for WSN reliability, and the packet loss control also occurs on the publisher side. The adaptive RTO protocol dynamically calculates the retransmission timeout based on the network architecture and network conditions. The adaptive RTO protocol exploits the smooth round-trip time (SMRTT) to estimate network conditions and calculate an updated RTO. A K parameter is used to ensure an accurate estimation of the RTO and has a significant effect on the reliability mechanism of the RTO protocol and is evaluated in single and multi-hop topologies. Using adaptive methods, such as the RTO protocol, can improve reliability in constrained networks, such as WSNs. For example, the adaptive RTO method increases the packet delivery ratio (PDR) of MQTT-S by 76% and CoAP by 38% when using an appropriate value for the K parameter.

SUMMARY

In an exemplary embodiment, a device includes circuitry configured to determine a reliability level for a communication network, determine a packet delivery ratio (PDR) for a round period of the communication network operating at an adaptive reliability level based on a packet serial number (PSN), and control the communication network in a best effort mode, a reliable mode, or a switching mode based on the PDR.

In another exemplary embodiment, a method includes: determining, via a server, a reliability level for a communication network; determining, via the server, a packet delivery ratio (PDR) for a round period of the communication network operating at an adaptive reliability level based on a packet serial number (PSN); and controlling, via the server, the communication network in a best effort mode, a reliable mode, or a switching mode based on the PDR.

In another exemplary embodiment, a non-transitory computer readable medium having instructions stored therein that, when executed by one or more processor, cause the one or more processors to perform a method of adaptively controlling a reliability protocol, the method including: determining a reliability level for a communication network; determining a packet delivery ratio (PDR) for a round period of the communication network operating at an adaptive reliability level based on a packet serial number (PSN); and controlling the communication network in a best effort mode, a reliable mode, or a switching mode based on the PDR.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Figure 1:
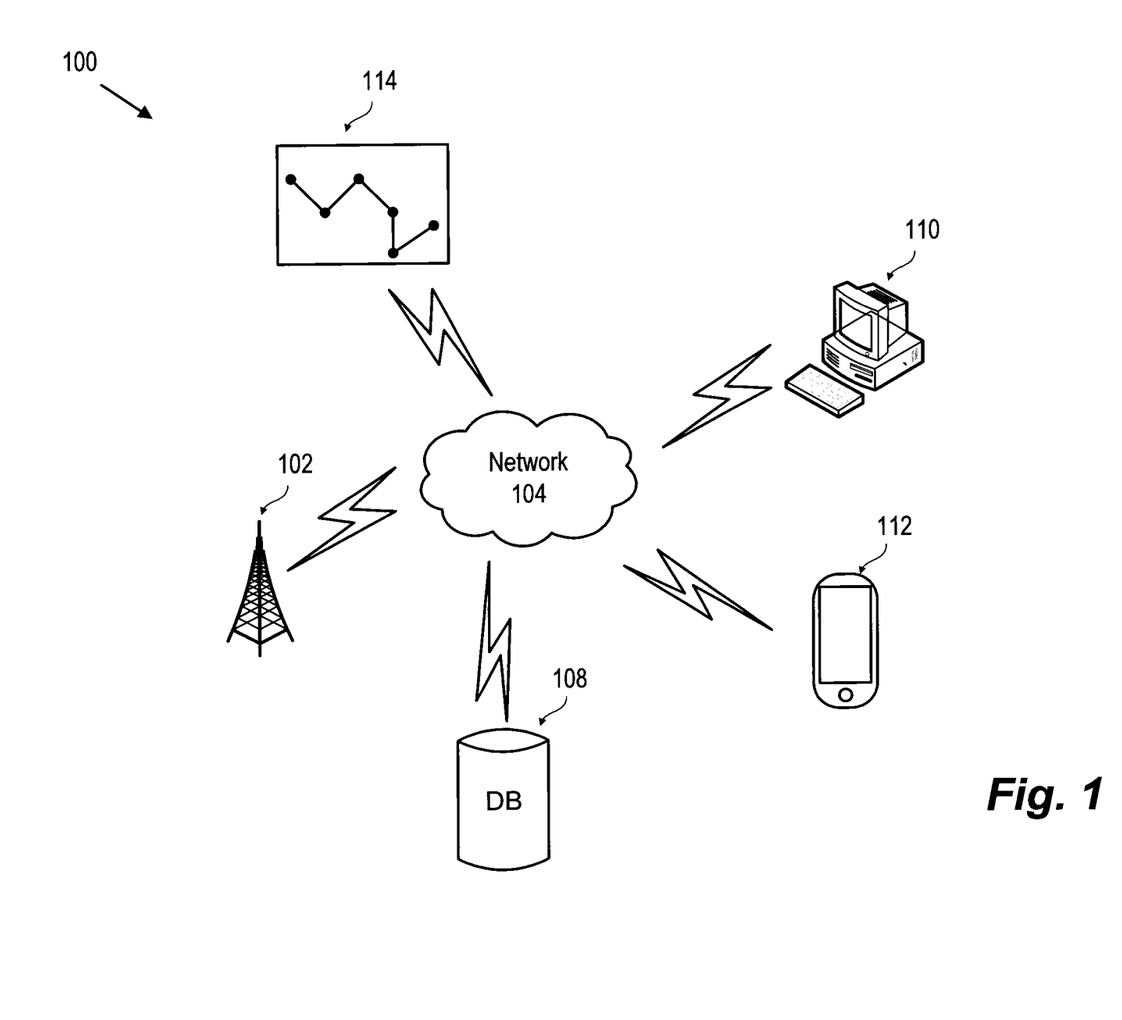
FIG. 1 is a schematic diagram of an adaptive reliability protocol system, according to certain embodiments.

Aspects of this disclosure are directed to a system, device, and method for applying an adaptive quality of service (QoS) protocol to wireless sensor networks (WSNs). In some implementations, an adaptive reliability protocol system 100 includes a base station that receives sensor data from a communication network, such as a WSN, and determines a mode of operation for transmitting and/or receiving data packets based on a packet delivery ratio (PDR).

FIG. 1 is a schematic diagram of an adaptive reliability protocol system 100, according to certain embodiments. The computer 110 represents at least one computer 110 and acts as a client device that is connected to a database 108, a mobile device 112, a base station 102, and a wireless sensor network (WSN) via a network 104. In some implementations, the computer 110 is used to view past and current PDRs, operation modes, and other specifications associated with transmission and reception of sensor data packets. A user can also input a reliability level for the adaptive reliability protocol system 100 via an interface at the computer 110. In some implementations, the reliability level corresponds to minimum percentage of successfully delivered packets that may be guaranteed by the adaptive reliability protocol system 100. Details regarding the reliability level are discussed further herein.

The base station 102 represents one or more base stations connected to the computer 110, the database 108, the mobile device 112, and the WSN 114 via the network 104. According to certain embodiments, the base station 102 can include processing circuitry that processes received sensor data from the WSN 114, determines a determines a reliability level for the adaptive reliability protocol system 100, determines the PDR for the system 100 by processing data packets having a predetermined length, and controls operation of the system 100 in a best effort mode or a reliability mode based on the PDR. By determining the PDR and associated operation mode at the base station 102 having an approximately unlimited energy source, a processing burden on the WSN 114 can be reduced. Details regarding the processes performed by the processing circuitry of the base station 102 are discussed further herein.

The database 108 represents one or more databases connected to the computer 110, the base station 102, the WSN 114, and the mobile device 112 via the network 104. In some implementations, historical data associated with the adaptive reliability protocol system 100, such as previously measured PDRs, reliability levels, and other performance metrics can be stored in the database 108.

The WSN 114 represents one or more WSNs connected to the computer 110, the base station 102, the database, 108, and the mobile device 112 via the network 104. In some implementations, the WSN can include one or more spatially distributed sensor nodes that are configured to monitor physical and/or environmental conditions. For example, sensors installed in an electrical system of a vehicle can be configured to sense voltage, current, temperature, and the like. In addition, weather sensors can include humidity sensors, temperature sensors, pressure sensors, wind sensors, and the like. The sensors of the WSN 114 can transmit sensor data via the sensor nodes to a primary node that can transmit the sensor data to the base station 102 for further processing. In some implementations, operating the WSN 114 at a predetermined reliability level involves processing overhead that may not be able to be met by the processing resources associated with the WSN 114. By applying an adaptive reliability protocol to the WSN 114, the processing overhead can be reduced while still being able to achieve minimum PDRs. In some implementations, processing circuitry associated with the WSN 114 can be configured to perform the processes described herein.

The mobile device 112 represents one or more mobile devices connected to the computer 110, the base station 102, the WSN 114, and the database 108 via the network 104. The network 104 represents one or more networks, such as the Internet, connecting the computer 110, the base station 102, the database 108, the WSN 114, and the mobile device 112. The network 104 can also communicate via wireless networks such as WI-FI, BLUETOOTH, cellular networks including EDGE, 3G and 4G wireless cellular systems, or any other wireless form of communication that is known.

As would be understood by one of ordinary skill in the art, based on the teachings herein, the mobile device 112 or any other external device could also be used in the same manner as the computer 110 to input and view the reliability level and other performance specifications for the adaptive reliability protocol system 100. In addition, the computer 110 and mobile device 112 can be referred to interchangeably throughout the disclosure. Details regarding the processes performed by the adaptive reliability protocol system 100 are discussed further herein.

Figure 2:
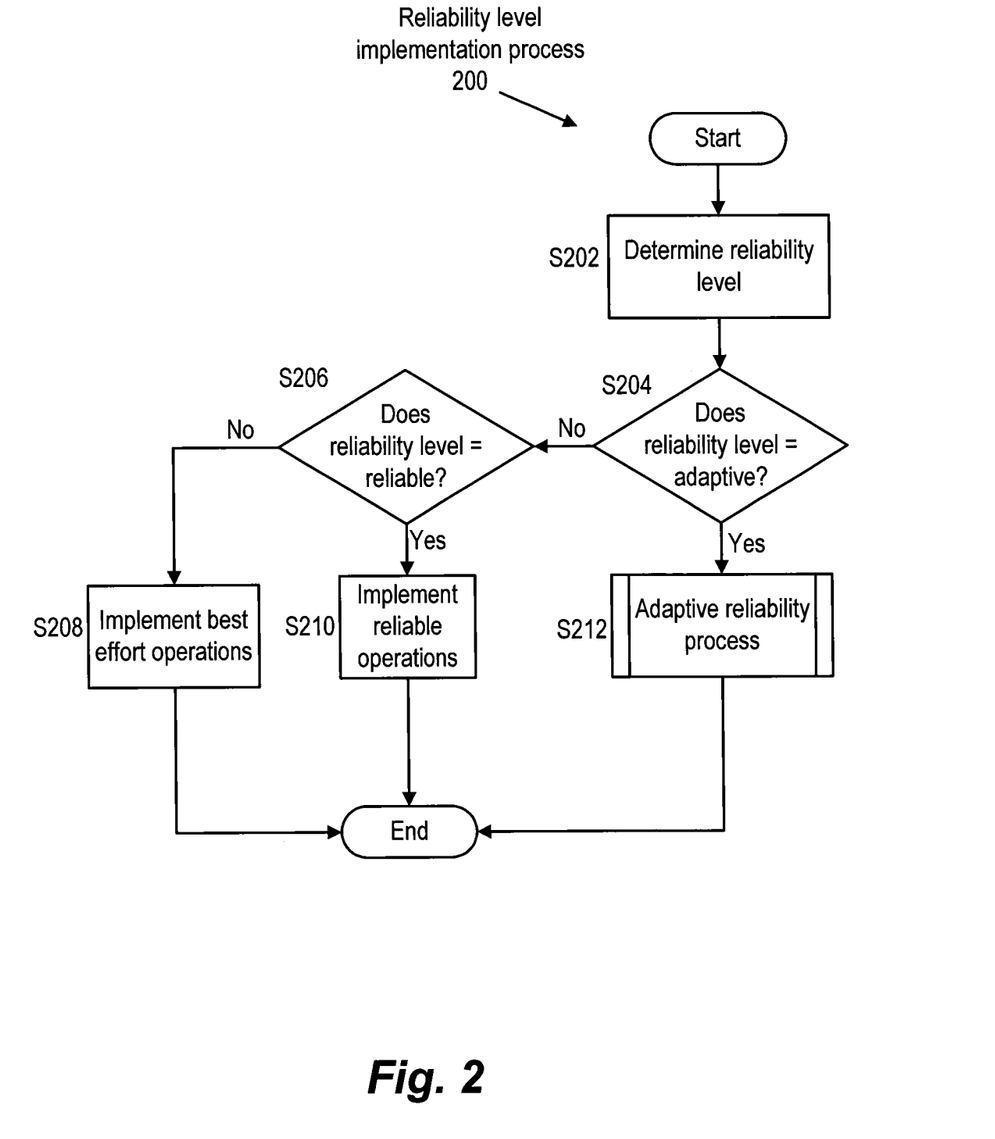
FIG. 2 is an exemplary flowchart of a reliability level determination process, according to certain embodiments.

FIG. 2 is an exemplary flowchart of a reliability level determination process 200, according to certain embodiments. In some implementations, the reliability level determination process 200 implements an adaptive reliability quality of service (ARQoS) protocol that can support three levels ranging from a lowest reliability to a highest reliability. The ARQoS protocol can be designed to operate at a middleware or application layer, independent from protocols associated with other underlying layers. Throughout the disclosure, the term reliability refers to how consistently data packets transmitted from the WSN 114 are successfully received by the base station 102. The reliability levels associated with the ARQoS protocol can quantify how consistently the base station 102 successfully receives the sensor data transmitted from the WSN 114. According to some aspects, the reliability levels include best effort, adaptive, and reliable levels where the best effort level corresponds to a lowest reliability, and a reliable level corresponds to a highest reliability.

At step S202, the processing circuitry of the base station 102 determines a reliability level for the WSN 114 based on network specifications, application of the WSN 114, and the like. In some implementations, the processing circuitry may determine the reliability level based on a rate of change of conditions monitored by the WSN 114. For example, environmental conditions monitored by a WSN 114, such as air pollution monitoring or water quality monitoring, may have a slower rate of change than an application where the WSN 114 is used to detect biological symptoms of a patient who has suffered from a serious medical condition, such as a stroke or a heart attack. In addition, the processing circuitry of the base station 102 can also determine the reliability level based on a level of criticality associated with the application of the WSN 114. For example, the level of criticality, which can also be referred to as time sensitivity, of a WSN 114 associated with monitoring conditions in a tactical military environment may be higher than a WSN 114 associated with monitoring environmental conditions of a greenhouse. In addition, higher reliability levels can be associated with higher levels of criticality for the WSN 114. The processing circuitry of the base station 102 can determine the reliability level as a function of at least one of the rate of change and the level of criticality of the application of the WSN 114.

The rates of change and levels of criticality associated with the WSN 114 can be input via an interface at the computer 110 and/or mobile device 112 and stored in the database 108 of the adaptive reliability protocol system 100. The reliability level for the WSN 114 can also be manually input via the interface at the computer 110 and/or mobile device 112. The rates of change and/or levels of criticality can also be based on learned trends from the WSN 114 and other WSNs associated with related applications. For example, the rate of change criticality level associated with a WSN that monitors air pollution can be based on learned statistical data from other WSNs that monitor air pollution or other environmental factors. The processing circuitry of the base station 102 can modify the rates of change and the criticality levels associated with each type of WSN stored in the database 108 based on learned trends as sensor data is received and processed by the adaptive reliability protocol system 100. Also, the processing circuitry can also use other WSN statistics that are stored in the database 108 and/or accessed via a web crawling process to determine how to modify the criticality levels and rates of change associated with the WSN 114.

In one implementation, the processing circuitry assigns the WSN 114 to one of the three reliability levels based on at least one of the rate of change and the level of criticality of the application of the WSN 114. In addition, the processing circuitry also determines reliability percentage values for the WSN 114 that quantify a minimum guaranteed level of accuracy with which the sensor data from the WSN 114 can be successfully transmitted from the WSN 114 to the base station 102. In one implementation, the reliability percentage value is based on a weighted average of the rate of change of the sensors of the WSN 114 and the criticality level of the WSN 114. For example, the weighted average of the rate of change and the criticality level can correspond to a predetermined reliability percentage value for the WSN 114, which can be accessed via look-up tables that are stored in the database 108. The processing circuitry can also determine the reliability percentage value based on a manual input via an interface at the computer 110. In addition, the reliability percentage value can correspond to a minimum packet delivery ratio (PDR) at which the adaptive reliability protocol system 100 operates.

For example, the best effort level may be a lowest reliability level that is associated with a reliability percentage value of 0%. In addition, the reliable level may be a highest reliability level that is associated with a reliability percentage value of 100%. An adaptive reliability level is between the best effort and the reliable levels and corresponds to a reliability percentage value from 1% to 99%. For example, the reliability percentage values can indicate a minimum packet delivery ratio (PDR) for the WSN 114. For example, a 90% reliability percentage value may correspond to a minimum allowed PDR of 90% for the WSN 114. In some embodiments, at session initiation, the processing circuitry of the base station 102 transmits an initiation data packet to the WSN 114 indicating the reliability percentage value and corresponding reliability level. For example, one or more bits of the initiation data packet can be allocated to indicating the reliability percentage value.

At step S204, the processing circuitry of the base station 102 determines whether the reliability level for the WSN 114 is adaptive. For example, the adaptive reliability level corresponds to a reliability percentage value from 1% to 99%, which can be determined at step S202. If it is determined that the reliability level is adaptive, resulting in a "yes" at step S204, then step S212 is performed. Otherwise, if the reliability level is best effort or reliable, resulting in a "no" at step S204, then step S206 is performed.

At step S212, if it is determined that the reliability level for the WSN 114 is adaptive, an adaptive reliability process is performed. The processing circuitry of the base station 102 determines the PDR for a predetermined amount of time, also referred to as a round period. During the adaptive reliability process, the processing circuitry determines a mode of operation for the WSN 114 by comparing the PDR to an upper threshold and a lower threshold. Details regarding the adaptive reliability process are discussed further herein.

At step S206, if it is determined that the reliability level for the WSN 114 is not adaptive, the processing circuitry determines whether the reliability level for the WSN 114 is reliable. For example, the reliable reliability level corresponds to a reliability percentage value 100%, which can be determined at step S202. If it is determined that the reliability level is reliable, resulting in a "yes" at step S206, then step S210 is performed. Otherwise, if the reliability level is best effort, resulting in a "no" at step S206, then step S208 is performed.

At step S210, the reliable level is implemented at the WSN 114. In some implementations, the reliable operations are employed for applications of the WSN 114 with a highest rate of change and/or highest criticality level. For example, WSNs associated with tactical military operations, such as tracking a trajectory of a rocket, may be implemented at the reliable level with a reliability percentage value of 100%. The reliable level corresponds to a highest reliability level for the adaptive reliability protocol system 100, which may guarantee a 100% PDR from the WSN 114 to the base station 102. The reliable level can also be implemented in non-time-sensitive applications where ensuring that all of the sensor data is received may have a higher priority than transmitting the sensor data within a predetermined period of time. When the reliable level is implemented, the base station 102 and WSN 114 use negative acknowledgement (NACK) to ensure all data is received and also reduce processing overhead when compared with other methods of protocol message acknowledgement.

At step S208, if it is determined that the reliability level for the WSN 114 is not the reliable level, best effort operations are implemented at the WSN 114. In some implementations, the best effort reliability level corresponds to a reliability percentage value 0%, which can be determined at step S202. In some implementations, the best effort operations are employed for applications of the WSN 114 with a lowest rate of change and/or lowest criticality level. For example, WSNs associated with monitoring slow-changing environmental conditions, such as water levels in a lake or river may be implemented at the best effort level with a reliability percentage value of 0%. The best effort level can also be implemented in time-sensitive applications where transmitting the sensor data within a predetermined period of time has a higher priority than ensuring that all of the sensor data is received. The best effort level corresponds to a lowest reliability level for the adaptive reliability protocol system 100, which may guarantee a 0% PDR from the WSN 114 to the base station 102. When the best effort level is implemented, no acknowledgements are used between the base station 102 and the WSN 114, and hence calculations and/or buffering at the base station and/or WSN 114 may not be performed, which reduces an amount of processing overhead.

Figure 3:
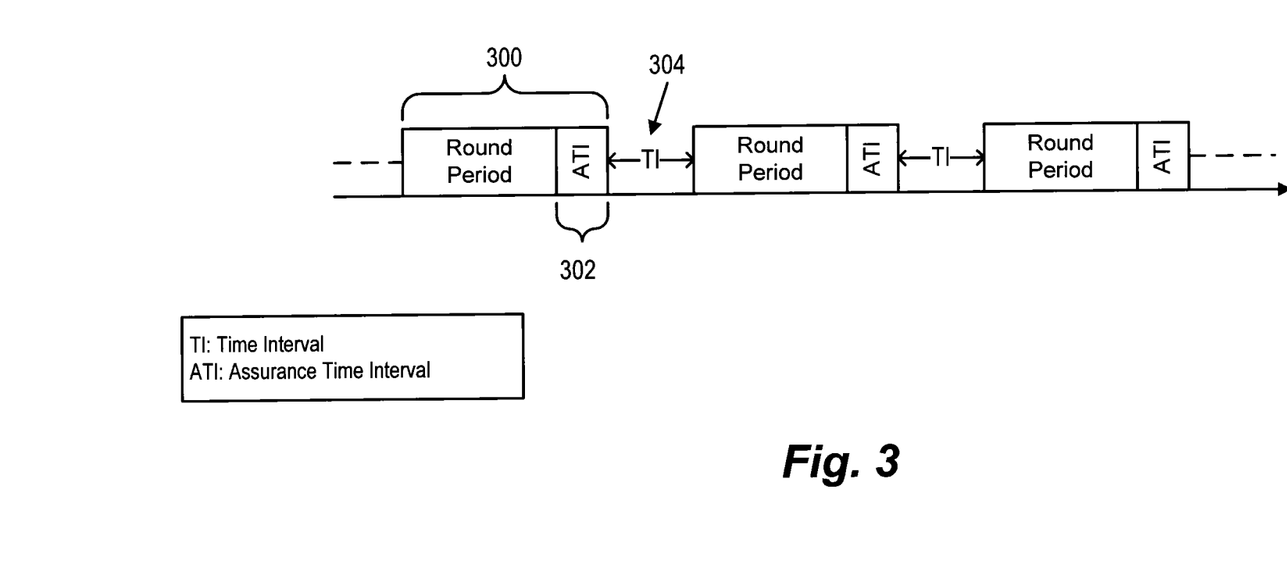
FIG. 3 is an exemplary illustration of a round period, according to certain embodiments.

FIG. 3 is an exemplary illustration of a round period 300, according to certain embodiments. When the adaptive reliability process of step S212 is employed, the processing circuitry of the base station 102 monitors the system reliability by measuring the PDR for the sensor data received from the WSN 114 over a first predetermined time interval, which can also be referred to as a round. Each round period 300 can have a predetermined time length and is separated from a preceding and subsequent round period 300 by a second predetermined time interval (TI) 304. In some implementations, the round period 300 is associated with a predetermined amount of data. The processing circuitry of the base station 102 can determine the length of the round period 300 and the TI 304 based on the data characteristics and/or performance specifications of the WSN 114, the type of sensor application, network stability, and the like. For example, the processing circuitry may increase the length of the round period 300 when the network stability of the WSN 114 decreases, which may be indicated by erratic PDR measurements that have a variance greater than a predetermined threshold. In addition, the processing circuitry may decrease the length of the time between round periods (TI) 304 as the network stability of the WSN 114 decreases.

The round period 300 also includes an assurance time period (ATI) 302 corresponding to a termination of the round period 300. In some implementations, the ATI 302 indicates to the processing circuitry that all of the packets associated with the round period 300 have been received. For example, each packet that is transmitted within the round period 300 is assigned a packet serial number (PSN), and a PSN associated with a most recently received packet is referred to as a last packet serial number (LPSN). Receiving the ATI 302 at the end of the round period 300 indicates to the processing circuitry of the base station 102 that all of the packets with PSNs less than the LPSN have been received. In some implementations, the processing circuitry of the base station 102 can identify the ATI 302 at the end of the round period 302 by a predetermined ATI bit in a message that is set when the ATI 302 is transmitted. The ATI 302 can improve efficiency of a round packet allocation process described further herein because the base station 102 and WSN 114 may not need to exchange multiple messages to determine that the end of the round period 302 has occurred.

Figure 4:
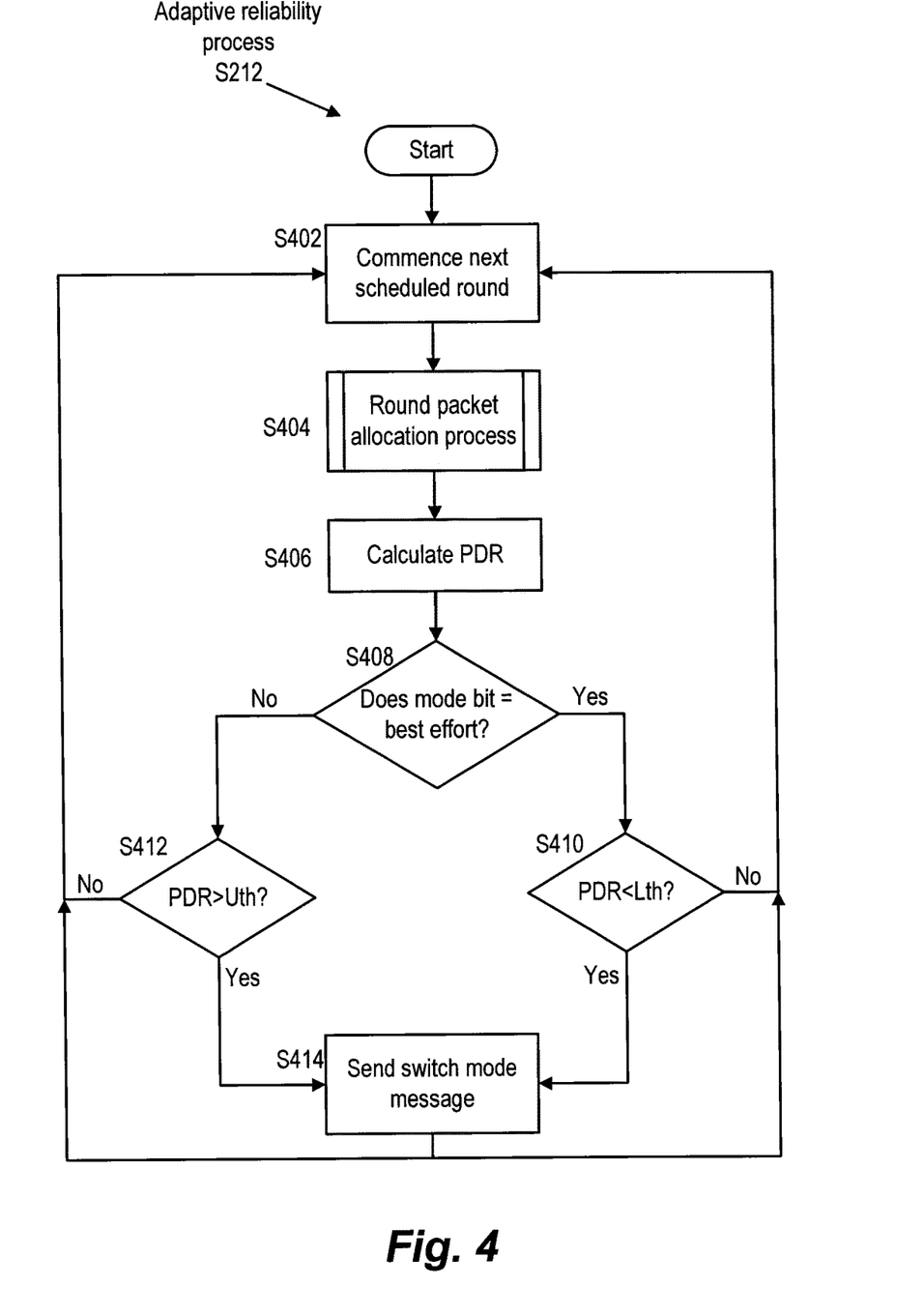
FIG. 4 is an exemplary flowchart of an adaptive reliability process, according to certain embodiments.

FIG. 4 is an exemplary flowchart of an adaptive reliability process of step S212 of the reliability level determination process 200, according to certain embodiments. When the WSN 114 is operating at the adaptive reliability level, the processing circuitry of the base station 102 uses the PDR calculated for at least one round period 300 to determine whether the adaptive reliability protocol system 100 operates in a best effort mode or a reliable mode. Operations in the best effort mode and the reliable mode correspond to how the adaptive reliability protocol system 100 operates at the best effort reliability level and the reliable reliability level as described previously. In other implementations, the adaptive reliability process S212 can also be performed at the WSN 114.

The processing circuitry of the base station 102 controls the switching between the best effort mode and the reliable mode as the PDR for the WSN 114 changes over time. The switching between the best effort mode and the reliable mode is based on an upper PDR threshold and lower PDR threshold. For example, if the WSN 114 is operating in the best effort mode, and the PDR is less than a lower threshold, the processing circuitry of the base station 102 can issue a control signal to switch a current operation mode to the reliable mode. Likewise, if the WSN 114 is operating in the reliable mode, and the PDR is greater than an upper threshold, then the processing circuitry can issue a control signal switch the current operation mode to the best effort mode. Details regarding determining the upper PDR threshold and the lower PDR threshold are discussed further herein. By implementing the adaptive reliability process, the processing overhead for the WSN 114 can be reduced by increasing or decreasing the reliability in response to dynamic network conditions.

At step S402, the processing circuitry of the base station 10 commences processing of a scheduled round. In some implementations, the scheduled round can also be interchangeably referred to as a current round. Each round period 300 can have a predetermined time length and is separated from a preceding and subsequent round period 300 by a second predetermined time interval (TI) 304. In some implementations, the round period 300 is associated with a predetermined amount of data.

At step S404, the processing circuitry performs a round packet allocation process. In some implementations, the round packet allocation process includes processing packet serial numbers (PSNs) associated with received packets during the round period 300 in order to determine a number of received packets and a number of dropped packets per round. Details regarding the round packet allocation process are discussed further herein.

At step S406, the processing circuitry of the base station 102 calculates the PDR for the current round based on the number of received packets and dropped packets determined during the round packet allocation process of step S404. For example, the PDR can be calculated according to the equation:

$$PDR = \frac{R}{R+D}(\%),$$

where R indicates a number of received packets during the round period 300, and D represents a number of dropped packets during the round period 300. In certain embodiments, performance metrics other than the PDR can be calculated to determine whether the WSN 114 operates in the best effort mode or the reliable mode.

At step S408, the processing circuitry of the base station 102 determines whether a mode bit in a message header corresponds to best effort operations. In some implementations, a message header of a message sent between the base station 102 and the WSN 114 can include a mode bit indicating whether the best effort mode, reliable mode, or switching mode is in effect. If the mode bit corresponds to best effort operations, resulting in a "yes" at step S408, then step S410 is performed. Otherwise, if the mode bit does not correspond to best effort operations, resulting in a "no" at step S408, then step S412 is performed.

At step S410, if the mode bit corresponds to the best effort operations, the processing circuitry compares the PDR to a lower threshold to determine if the PDR is less than the lower threshold. If the WSN 114 is operating in the best effort mode and the PDR is less than the lower threshold, the PDR may increase when the reliable mode is implemented. If the PDR is less than the lower threshold, resulting in a "yes" at step S410, then step S414 is performed. Otherwise, if the PDR is greater than or equal to the lower threshold, resulting in a "no" at step S410, then the adaptive reliability process proceeds to step S402 to commence the next schedule round.

At step S412, if the mode bit does not correspond to the best effort operations, meaning that the mode bit corresponds to reliable operations, the processing circuitry compares the PDR to an upper threshold to determine if the PDR is greater than the upper threshold. For example, if the WSN is operating in the reliable mode and the PDR is greater than an upper threshold, the WSN 114 may be able to accommodate operating in the best effort mode while still maintaining the PDR that is greater than the reliability percentage value. Operating in the best effort mode can reduce an amount of processing overhead for the WSN 114. If the PDR is greater than the upper threshold, resulting in a "yes" at step S412, then step S414 is performed. Otherwise, if the PDR is less than or equal to the upper threshold, resulting in a "no" at step S410, then the adaptive reliability process proceeds to step S402 to commence the next schedule round.

Figure 6:
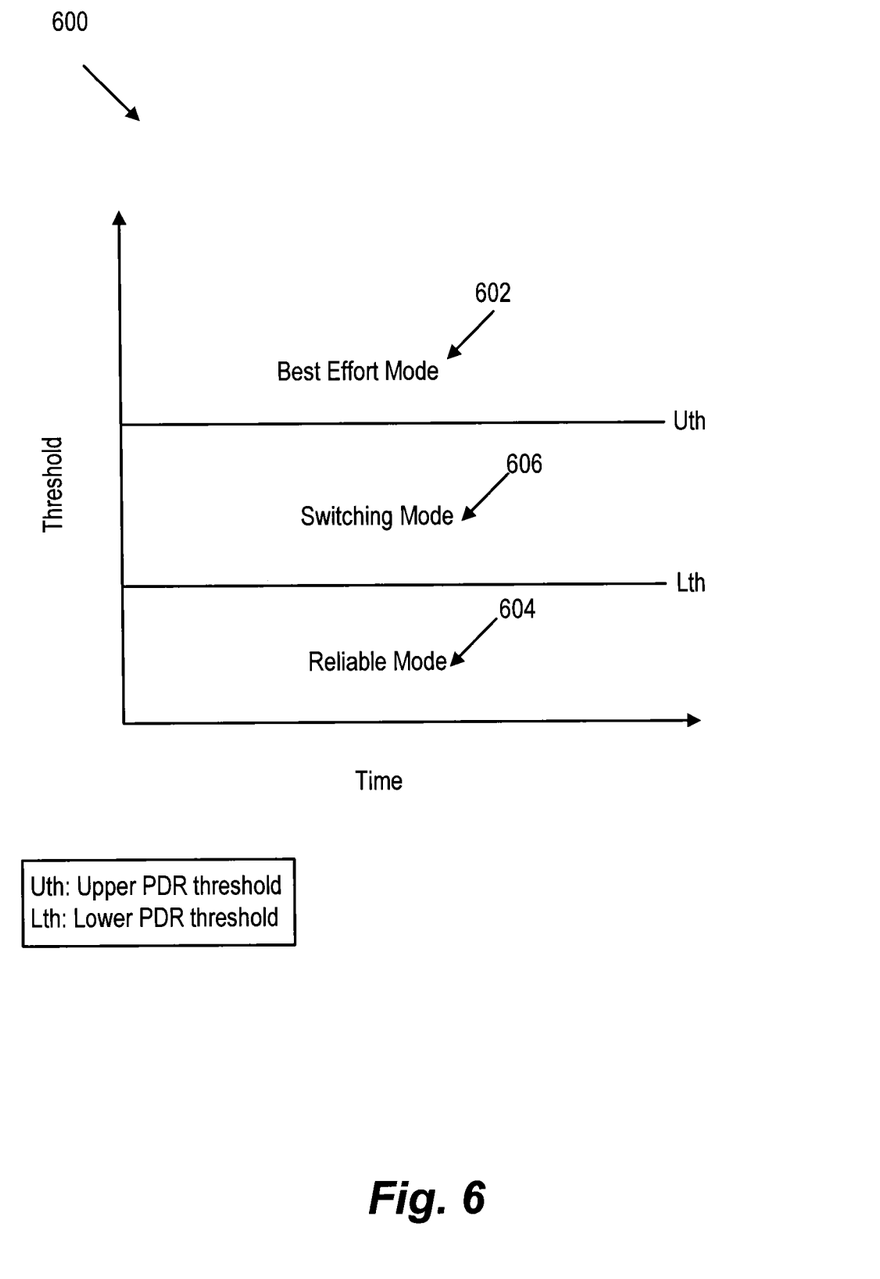
FIG. 6 is an exemplary illustration of adaptive reliability operation regions, according to certain embodiments.

At step S414, the processing circuitry issues a switch mode message to the WSN 114 to switch from the best effort operations to the reliable operations, or vice-versa. When the current operation mode is the reliable mode 604, and the processing circuitry determines that the PDR is greater than the upper threshold, the processing circuitry of the base station 102 issues a switch mode message and modifies the mode bit in the message header to switch to the best effort mode 602. When the current operation mode is the best effort mode 602, and the processing circuitry determines that the PDR is less than the lower threshold, the processing circuitry of the base station 102 issues a switch mode message and modifies the mode bit in the message header to switch to the reliable mode 604.

Figure 5:
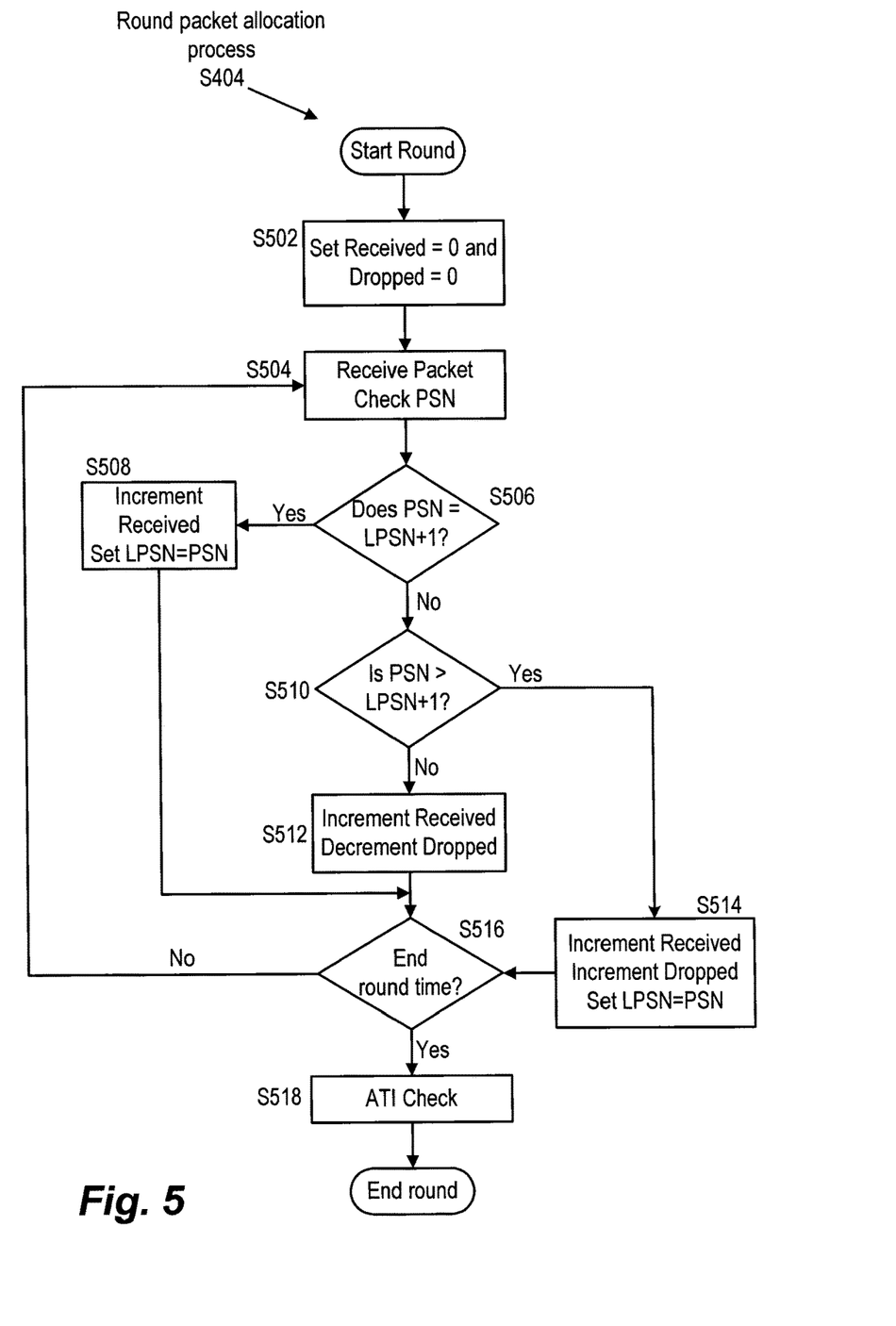
FIG. 5 is an exemplary flowchart of a round packet allocation process, according to certain embodiments.

FIG. 5 is an exemplary flowchart of a round packet allocation process of step S404 of the adaptive reliability process, according to certain embodiments. In some implementations, the round packet allocation process includes processing packet serial numbers (PSNs) associated with received packets during the round period 300 in order to determine a number of received packets and a number of dropped packets per round.

At step S502, when the round packet allocation process commences, the processing circuitry of the base station sets a received packet count for the round to zero and a dropped packet count for the round to zero. At step S504, when the processing circuitry of the base station receives a sensor data packet from the WSN 114, the processing circuitry identifies the packet serial number (PSN) associated with the sensor data packet. According to certain embodiments, the PSN is a unique identification number or code associated with each data packet transmitted by the WSN 114. The PSNs for subsequent data packets may be sequentially numbered so that later-transmitted data packets have higher PSNs than earlier-transmitted data packets. For example, the PSN may be incremented by a value of one for each consecutive data packet transmitted by the WSN 114.

At step S506, the processing circuitry determines whether a current PSN is equal to the last PSN (LPSN) incremented by a value of one (LPSN+1), which can indicate that a packet was not dropped between receiving the last packet and receiving the current packet. If the current PSN is not equal to the LPSN+1, then a packet may have been dropped or another previously transmitted packet may have been received. If the current PSN is equal to the LPSN+1, resulting in a "yes" at step S506, then step S508 is performed. Otherwise, if the PSN is not equal to the LPSN+1, resulting in a "no" at step S506, then step S510 is performed.

At step S508, if the current PSN is equal to the LPSN+1, then the processing circuitry of the base station 102 increments the received packet count by one. In addition, the processing circuitry also sets the LPSN equal to the PSN in preparation for commencing a subsequent iteration of the round packet allocation process.

At step S510, if the current PSN is not equal to the LPSN+1, then the processing circuitry of the base station 102 determines whether the current PSN is greater than the LPSN+1. For example, a packet of sensor data transmitted from the WSN 114 may have been dropped if the current PSN is greater than the LPSN+1. If the current PSN is not equal to the LPSN+1, then the current PSN may correspond to a previously transmitted data packet that is received by the processing circuitry of the base station 102 out of sequential order. If the current PSN is greater than the LPSN+1, resulting in a "yes" at step S510, then step S514 is performed. Otherwise, if the PSN is not greater than the LPSN+1, resulting in a "no" at step S510, then step S512 is performed.

At step S514, if the current PSN is greater than the LPSN+1, then the processing circuitry of the base station 102 increments the received packet count by one and also increments the dropped packet count by one. In addition, the processing circuitry also sets the LPSN equal to the PSN in preparation for commencing a subsequent iteration of the round packet allocation process.

At step S512, if the current PSN is not greater than the LPSN+1, then the processing circuitry of the base station 102 increments the received packet count by one and decrements the dropped packet count by one. If the current PSN is not equal to the LPSN+1, then the current PSN may correspond to a previously transmitted data packet that is received by the processing circuitry of the base station 102 out of sequential order.

At step S516, the processing circuitry of the base station 102 determines whether the round period 300 has expired. In some implementations, the processing circuitry determines a predetermined length for the round period 300 that can be based on the performance specifications of the WSN 114, the type of sensor application, network stability, and the like. In some implementations, the processing circuitry initiates a timer when the round allocation process commences for an individual round to measure an amount of elapsed time for the current round. If the amount of time that has elapsed for the current round is greater than or equal to the round period, resulting in a "yes" at step S516, then step S518 is performed. Otherwise, if the amount of time that has elapsed for the current round is less than the round period, resulting in a "no" at step S516, then the round allocation process proceeds to step S504 to identify the PSN associated with a subsequently received data packet from the WSN 114.

At step S518, the processing circuitry of the base station 102 verifies that the ATI 302 of the round period 300 has been received. Receiving the ATI 302 at the end of the round period 300 indicates to the processing circuitry of the base station 102 that all of the packets with PSNs less than the LPSN have been received. In some implementations, the processing circuitry of the base station 102 can identify the ATI 302 at the end of the round period 302 by a predetermined ATI bit that is set when the ATI 302 is transmitted.

FIG. 6 is an exemplary illustration of adaptive reliability operation regions 600, according to certain embodiments. The adaptive reliability operation regions 600 include a best effort mode 602, a reliable mode 604, and a switching mode 606. When the adaptive reliability level is in effect, the adaptive reliability protocol system 100 operates in one of three operation regions based on the PDR calculated for the round period 300 as previously discussed. The processing circuitry of the base station 102 determines one or more PDR thresholds that are used to determine which operation mode is in effect. For example, the processing circuitry can determine an upper PDR threshold (Uth) that is used to determine when to switch from the reliable mode to the best effort mode. When the current operation mode is the reliable mode 604, and the processing circuitry determines that the PDR is greater than the upper threshold, the processing circuitry of the base station 102 issues a switch mode message and modifies the mode bit in the message header to switch to the best effort mode 602. When the current operation mode is the best effort mode 602, and the processing circuitry determines that the PDR is less than the lower threshold, the processing circuitry of the base station 102 issues a switch mode message and modifies the mode bit in the message header to switch to the reliable mode 604.

According to certain embodiments, the switching mode 606 is a region bounded by the upper PDR threshold and the lower PDR threshold which indicates instances where the WSN 114 is switching between the reliable mode 604 and the best effort mode 602. For example, the base station 102 and WSN 114 operate in the switching mode when a current operation mode is the best effort mode and the PDR is less than the lower PDR threshold. In addition, the base station 102 and WSN 114 operate in the switching mode when a current operation mode is the reliable mode and the PDR is greater than the upper PDR threshold.

In some implementations, the processing circuitry of the base station 102 determines the upper PDR threshold and lower PDR threshold during an initialization process for the WSN 114. For example, the upper and lower PDR thresholds may be based on the reliability percentage value. In one example, the processing circuitry sets the lower PDR threshold equal to the reliability percentage value and sets the upper PDR threshold equal to a predetermined percent higher than the lower PDR threshold value. For example, if the reliability percentage value is equal to 90%, the processing circuitry may set the lower PDR threshold equal to 90%, and the upper PDR threshold equal to 95%. The processing circuitry may also set the upper PDR threshold to a value greater than the reliability percentage value and the lower PDR threshold to a value less than the reliability percentage value.

A predetermined amount of separation between the lower PDR threshold and the upper PDR threshold may be based on an amount of network instability associated with the WSN 114. In some implementations, double thresholds are used to switch back and forth between the best effort mode 602 and the reliable mode 604 to reduce switching overhead caused by network instability. For example, if the network instability of the WSN 114 increases the amount of switching between the reliable mode 604 and the best effort mode 602, the processing circuitry of the base station 102 may increase the predetermined amount of separation between the upper PDR threshold and the lower PDR threshold.

A hardware description of an exemplary base station 102 for performing one or more of the embodiments described herein is described with reference to FIG. 7. In addition, the hardware described by FIG. 7 can also apply to the computer 110 as well as circuitry associated with the WSN 111. When the base station 102, computer 110, and/or WSN 114 are programmed to perform the processes related to video editing described herein, the base station 102, computer 110, and/or WSN 114 becomes a special purpose device. Implementation of the processes of adaptive reliability protocol system 100 on the hardware described herein improves the efficiency of monitoring the location of pilgrims in congested areas and monitoring medical conditions of the pilgrims. In addition, the processes described herein can also be applied to other types of tracking and surveillance technologies.

The base station 102 includes a CPU 700 that perform the processes described herein. The process data and instructions may be stored in memory 702. These processes and instructions may also be stored on a storage medium disk 704 such as a hard drive (HDD) or portable storage medium or may be stored remotely. Note that each of the functions of the described embodiments may be implemented by one or more processing circuits. A processing circuit includes a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the base station 102 communicates, such as the WSN 114 and/or the computer 110.

Further, the claimed advancements may be provided as a utility application, background daemon, or component of an operating system, or combination thereof, executing in conjunction with CPU 700 and an operating system such as Microsoft Windows, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

Figure 7:
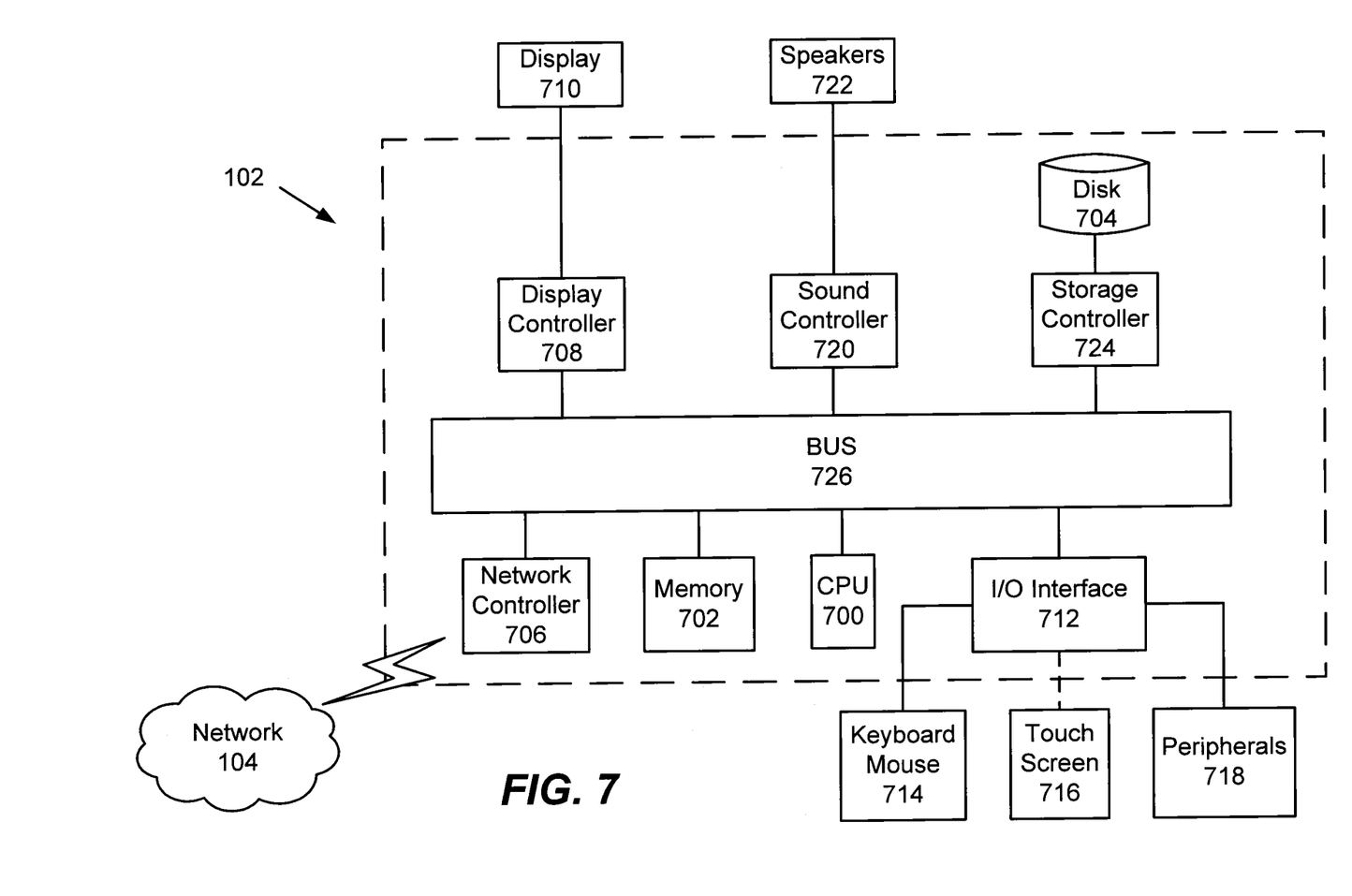
FIG. 7 is an illustration of a non-limiting example of base station circuitry, according to certain embodiments.

The base station 102 in FIG. 7 also includes a network controller 706, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN subnetworks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The base station 102 further includes a display controller 708, such as a NVIDIA GeForce GTX or Quadro graphics adaptor from NVIDIA Corporation of America for interfacing with display 710 of the base station 102 and the computer 110, such as an LCD monitor. A general purpose I/O interface 712 at the base station 102 interfaces with a keyboard and/or mouse 714 as well as a touch screen panel 716 on or separate from display 710. General purpose I/O interface 712 also connects to a variety of peripherals 718 including printers and scanners.

A sound controller 720 is also provided in the base station 102, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the base station 102. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
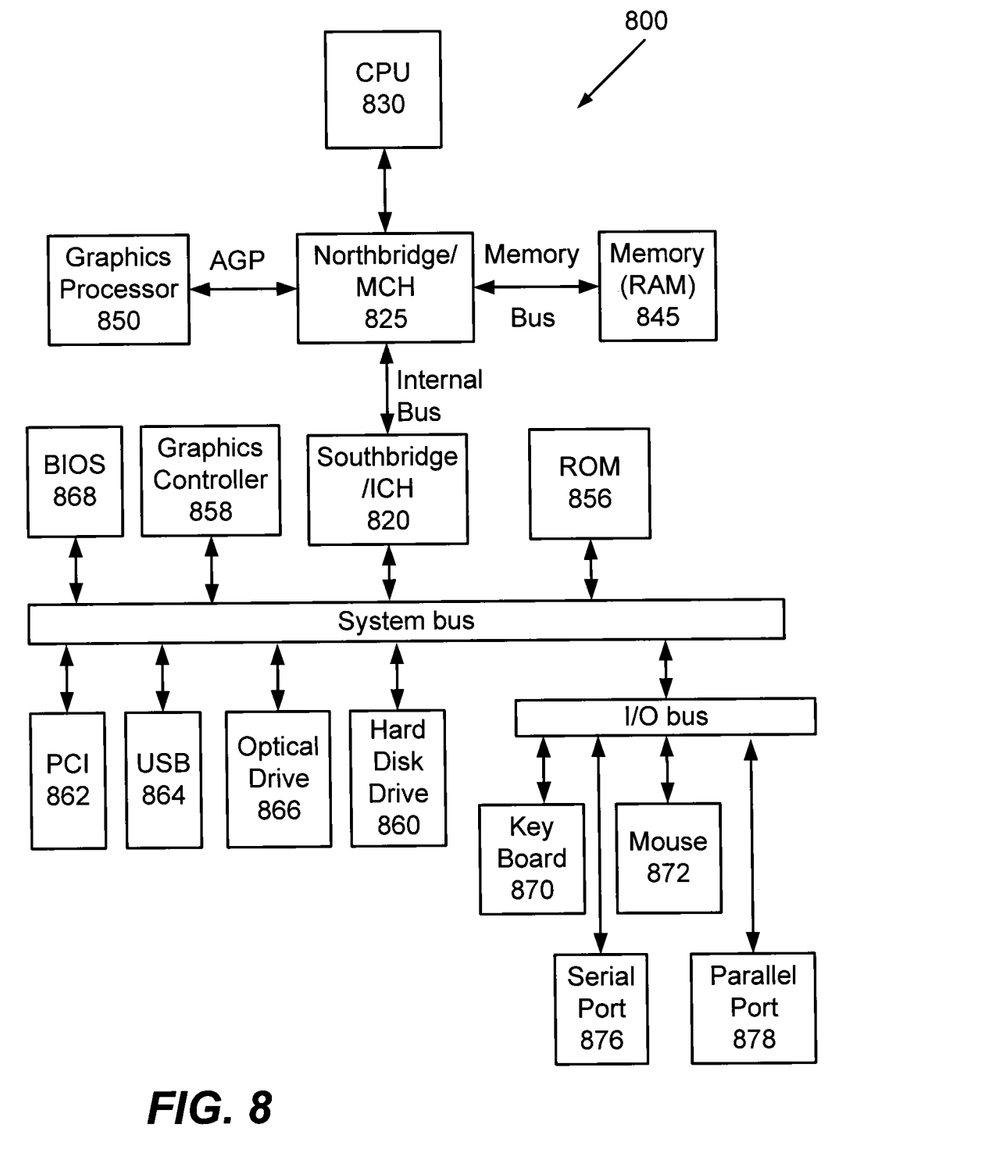
FIG. 8 is an exemplary schematic diagram of a data processing system, according to certain embodiments.

FIG. 8 shows a schematic diagram of a data processing system, according to certain embodiments, for performing the reliability level determination process 200 and/or the adaptive reliability process S212. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
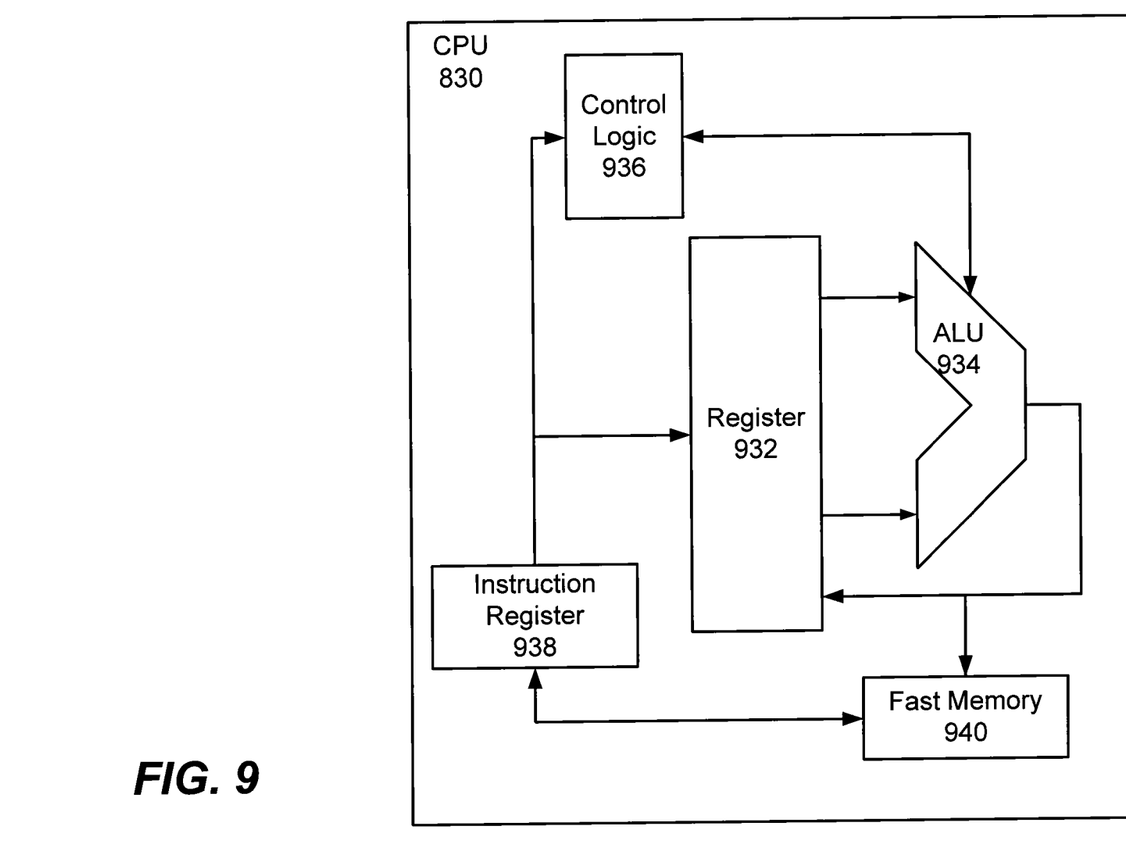
FIG. 9 is an exemplary schematic diagram of a processor, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH YYY through a PCI bus 968.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bust through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. In other alternate embodiments, processing features according to the present disclosure may be implemented and commercialized as hardware, a software solution, or a combination thereof. Moreover, instructions corresponding to the reliability level determination process 200 and/or the adaptive reliability process S212 in accordance with the present disclosure could be stored in a thumb drive that hosts a secure process.

According to certain embodiments, the adaptive reliability protocol system 100 provides the processing power to adaptively modify the operation mode of the WSN 114 between the best effort mode and the reliable mode based on the calculated PDR for one or more round periods in order to conserve processing resources of the WSN 114. The processes described herein can also be applied to other technical fields that involve adapting other types of communication networks to dynamically changing environments. In some embodiments, WSNs may have limited memory, bandwidth, and energy resources, and operating the WSN 144 above a predetermined reliability threshold may result in a processing overhead that may exceed the processing capabilities of the WSN 114. Providing the adaptive QoS protocol for the WSN 114 via the processes described herein can increase processing efficiency while maintaining a predetermined PDR.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A device comprising:
   processing circuitry configured to
      determine a reliability level for a communication network,
      determine a packet delivery ratio (PDR) for a round period of the communication network operating at reliability level based on a packet serial number (PSN), the round period being a predetermined period for measuring the PDR of sensor data received from the communication network,
      control the communication network to operate in an adaptive reliability mode in response to the reliability level being within a predetermined range, the adaptive reliability mode including a best effort mode, a reliable mode, and a switching mode based on the PDR, wherein the processing circuitry is further configured to
         control operation of the communication network to operate in the best effort mode in response to the PDR being greater than an upper PDR threshold,
         control operation of the communication network to operate in the reliable mode in response to the PDR is less than a lower PDR threshold, and
         control operation of the communication network to operate in the switching mode when transitioning between the best effort mode and the reliable mode, the control including issuing a switch mode message including a modified mode bit in the message header, and
      detect an assurance time interval (ATI) corresponding to a termination of the round period.

2. The device of claim 1, wherein the communication network is a wireless sensor network.

3. The device of claim 1, wherein the processing circuitry is further configured to determine a time length for the round period based on data characteristics of the communication network, the data characteristics including reliability performance specifications.

4. The device of claim 3, wherein the processing circuitry is further configured to determine an amount of time between successive round periods based on the data characteristics of the communication network.

5. The device of claim 1, wherein the processing circuitry is further configured to detect a dropped packet when a current PSN is greater than a last PSN plus one.

6. The device of claim 1, wherein the processing circuitry is further configured to determine the reliability level and an associated reliability percentage value for the communication network based on at rate of change of sensor values of one or more sensor devices associated with the communication network.

7. The device of claim 1, wherein the processing circuitry is further configured to determine an upper PDR threshold and lower PDR threshold based on the reliability percentage value.

8. The device of claim 7, wherein the processing circuitry is further configured to dynamically update the upper PDR threshold and lower PDR threshold based on network conditions.

9. The device of claim 1, wherein the processing circuitry is further configured to perform negative-acknowledgement (NACK) messaging in the reliable mode.

10. The device of claim 1, wherein the processing circuitry is further configured to operate in the switching mode when a current operation mode is the best effort mode and the PDR is less than a lower PDR threshold.

11. The device of claim 1, wherein the processing circuitry is further configured to operate in the switching mode when a current operation mode is the reliable mode and the PDR is greater than an upper PDR threshold.

12. The device of claim 1, wherein the processing circuitry is further configured to modify an operation mode of the communication network via a mode bit.

13. The device of claim 1, wherein the processing circuitry is further configured to operate in an application layer independent from a media access control (MAC) layer.

14. A method comprising:
determining, via a server, a reliability level for a communication network;
determining, via the server, a packet delivery ratio (PDR) for a round period of the communication network operating at reliability level based on a packet serial number (PSN), the round period being a predetermined period for measuring the PDR of sensor data received from the communication network;
controlling, via the server, the communication network to operate in an adaptive reliability mode in response to the reliability level being within a predetermined range, the adaptive reliability mode including a best effort mode, a reliable mode, and a switching mode based on the PDR;
the controlling further comprising:
controlling operation of the communication network to operate in the best effort mode in response to the PDR being greater than an upper PDR threshold,
controlling operation of the communication network to operate in the reliable mode in response to the PDR is less than a lower PDR threshold, and
controlling operation of the communication network to operate in the switching mode when transitioning between the best effort mode and the reliable mode, the control including issuing a switch mode message including a modified mode bit in the message header, and
detecting an assurance time interval (ATI) corresponding to a termination of the round period.

15. A non-transitory computer readable medium having instructions stored therein that, when executed by one or more processor, cause the one or more processors to perform a method of adaptively controlling a reliability protocol, the method comprising:
determining, via a server, a reliability level for a communication network;
determining, via the server, a packet delivery ratio (PDR) for a round period of the communication network operating at reliability level based on a packet serial number (PSN), the round period being a predetermined period for measuring the PDR of sensor data received from the communication network;
controlling, via the server, the communication network to operate in an adaptive reliability mode in response to the reliability level being within a predetermined range, the adaptive reliability anode including a best effort mode, a reliable mode, and a switching mode based on the PDR;
the controlling further comprising:
controlling operation of the communication network to operate in the best effort mode in response to the PDR being greater than an upper PDR threshold,
controlling operation of the communication network to operate in the reliable mode in response to the PDR is less than a lower PDR threshold, and
controlling operation of the communication network to operate in the switching mode when transitioning between the best effort mode and the reliable mode, the control including issuing a switch mode message including a modified mode bit in the message header, and
detecting an assurance time interval (ATI) corresponding to a termination of the round period.

16. The device of claim 1, wherein the circuitry detects the ATI by PSN to be a last packet serial number (LPSN).

* * * * *